Aug. 25, 1959  B. WALKER  2,901,285
VEHICLE LUGGAGE COMPARTMENT
Original Filed Jan. 22, 1953  2 Sheets-Sheet 1

INVENTOR.
Brooks Walker

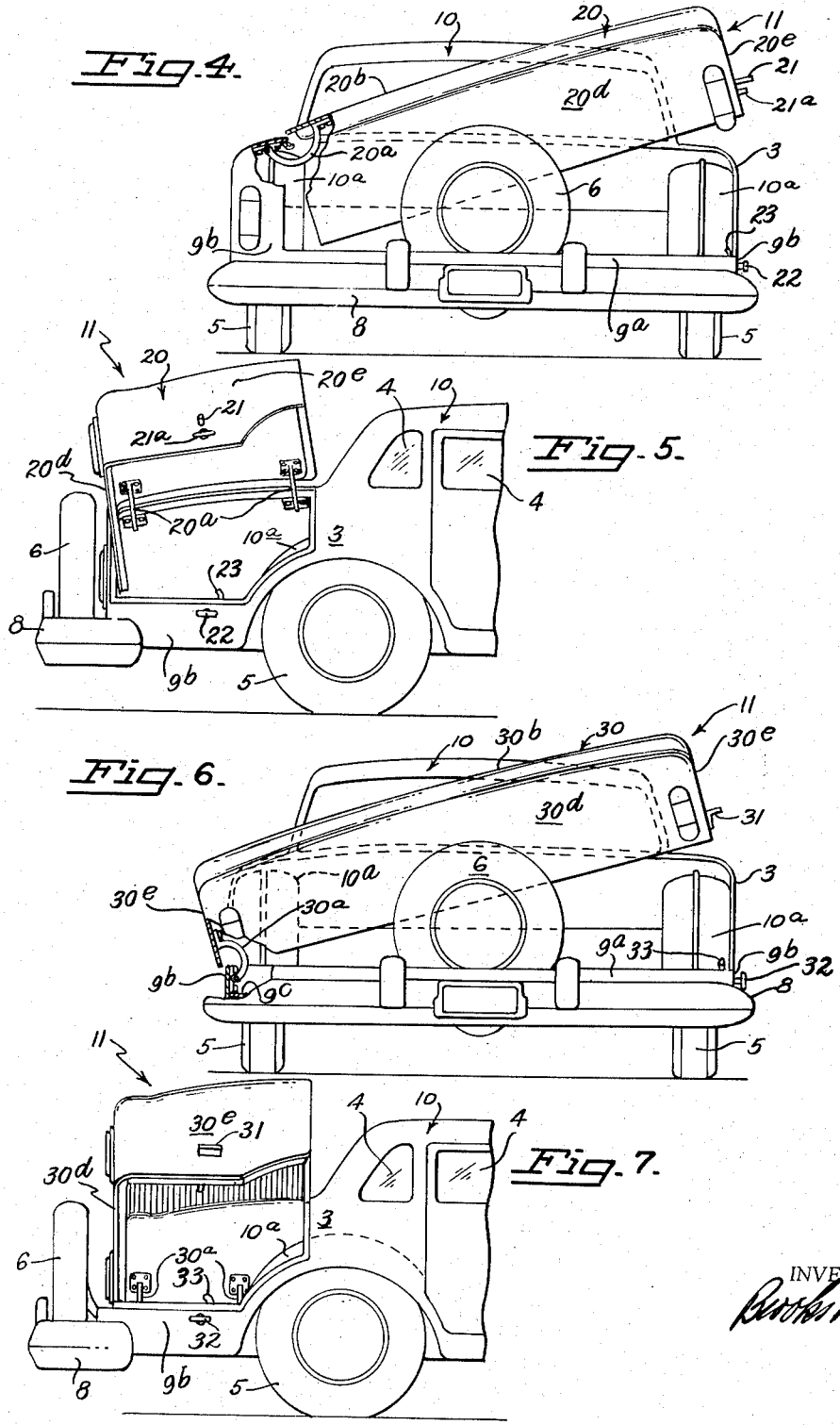

United States Patent Office 2,901,285
Patented Aug. 25, 1959

2,901,285

VEHICLE LUGGAGE COMPARTMENT

Brooks Walker, San Francisco, Calif.

Continuation of application Serial No. 332,627, January 22, 1953. This application November 5, 1958, Serial No. 772,033

9 Claims. (Cl. 296—37)

This invention relates to an improved luggage or storage compartment for a vehicle body and more particularly to an improved means for enabling access to such compartment from a side of the vehicle body.

This is a continuation application of my U.S. application, Serial No. 332,627, filed January 22, 1953, now abandoned for Vehicle Luggage Compartment.

Heretofore, luggage and storage compartments were usually accessible only from the rear of the vehicle body and in situations where the vehicle would be parked with the rear portion thereof in close proximity to or near the front portion of another vehicle, wall, etc., access to the luggage or storage compartment of the desired vehicle body was practically impossible. Further, in situations of breakdown or repair when the vehicle is parked on a busy highway and it is desirable to gain access to the luggage or storage compartment of the vehicle body, it is usually necessary for the operator to stand behind the vehicle body in a position which places the operator in danger of being struck by a vehicle which may be approaching from the rear.

It is the primary object of this invention to provide a vehicle body with an improved luggage or storage compartment which is accessible from a side of the vehicle body.

It is also an object of this invention to provide a vehicle body with an improved luggage or storage compartment that is larger and more easily accessible than the compartments heretofore provided in vehicle bodies with the improved compartment of this invention extending substantially the full width of the vehicle body and having a substantially continuous unobstructed opening thereinto with the access into the improved compartment being from a side of the vehicle body.

It is a further object of this invention to provide an improved rear luggage or storage compartment for a vehicle body which enables access to be had to the improved compartment from the side of the vehicle body without necessitating the operator to take a position to the rear of the vehicle body.

It is a still further object of this invention to provide an improved rear luggage or storage compartment of a vehicle body which enables access to be had from a side of the vehicle body so that easy access may be had to the improved compartment when the rear of the vehicle body is in close proximity to an object such as another parked vehicle or wall; which enables the operator to remain in a safe position while placing or removing luggage, articles, spare wheel assembly, tools, jack, etc., without taking a dangerous position to the rear of the vehicle body where the operator may be struck by an oncoming vehicle; so that an operator while gaining access to the improved compartment will not obstruct the view of the vehicle body, tail light, etc., from another vehicle which may be approaching from the rear.

It is an additional object of this invention to provide a luggage or storage compartment of a vehicle body with a closure member which opens from a side of the vehicle body and enables access to the improved compartment from the side of the vehicle body.

It is a further additional object of this invention to provide a rear luggage or storage compartment of a vehicle body with a closure member which is hingeably supported to the vehicle body by a hinge means which extends generally longitudinally of the vehicle body.

It is a further additional object of this invention to provide a rear luggage or storage compartment of a vehicle body with a closure member which is hingeably connected to the vehicle body by a hinge means which extends generally longitudinally of the vehicle body with the hinge means being disposed in a substantially vertical plane that is generally parallel to and/or substantially transversely spaced from a vertical plane that is common to the longitudinally extending center line of the vehicle body.

It is a further additional object of this invention to provide a rear luggage or storage compartment of a vehicle body with a closure member which enables access to the compartment from one side of the vehicle body with the closure member having a normally generally vertically disposed wall portion which forms a part of the one side of the vehicle body.

It is a still further additional object of this invention to provide a rear luggage or storage compartment of a vehicle body with a relatively small closure member which opens from a side of the vehicle body to enable ready access to the improved compartment for small articles acquired through day to day shopping without necessitating the use of the larger more inconvenient conventional type of closure members for the rear compartments of vehicle bodies which enable access to the conventional compartments only from the rear of the vehicle.

It is another object of this invention to provide a vehicle body that has a spare wheel assembly that is located on the rear portion of the vehicle body and which projects generally upwardly therefrom with an improved rear luggage or storage compartment which is accessible from a side of the vehicle body so that access may be had to the improved compartment without disturbing the position of the spare wheel assembly.

In order to acquire and accomplish the desired objects, as stated above, the present invention provides an improved luggage or storage compartment for a wheel mounted vehicle body wherein the improved compartment extends generally transversely of the vehicle body and is partly defined by a generally transversely extending upwardly projecting rear portion and generally longitudinally extending upwardly projecting laterally spaced side portions of the vehicle body. The improved compartment is substantially continuously unobstructed and open to given desired levels along the rear portion and at least one of the side portions to define an access opening which enables ready access into the improved compartment from one side of the vehicle body. A closure member is provided for closing the storage compartment and the closure member has a main body portion which is normally disposed generally horizontally and which has generally vertically disposed rear and side wall portions depending therefrom with the rear and side wall portions being substantially normal to the main body portion. The rear and side wall portions of the closure member extend generally downwardly and terminate immediately adjacent to and at substantially the respective level along both the rear portion and the corresponding side portions of the vehicle body which partly define the storage compartment. A hinge means is provided for hingeably connecting the closure member to the other side portion of the vehicle body with the hinge means being disposed in a generally longitudinally extending substantially vertical plane that is parallel to and/or transversely spaced from the vertical plane that is common to the longitudinally extending center line of the vehicle body so that the closure member may be raised about a generally horizontally disposed substantially longitudinally extending axis to enable access to the storage compartment from the one side of the vehicle body.

Other objects and important features of the invention will be apparent from a study of the specification following taken with the drawing which together describe and illustrate a number of preferred embodiments of the invention and what are now considered to be the best mode of practicing the principles thereof. Other embodiments may be suggested to those having the benefit of the teachings herein, and such embodiments are intended to be reserved especially as they fall within the scope and purview of the subjoined claims.

In the drawing:

Figure 4 is a rear elevational view of a vehicle body having another modification of the improved luggage and storage compartment embodied therein with a portion of the closure member for the compartment being broken away to more clearly illustrate the hinge means;

Figure 5 is a partial side elevational view of the vehicle body as illustrated in Fig. 4;

Figure 6 is a rear elevational view of a vehicle body having a still further modification of the improved luggage and storage compartment with a portion of the closure member therefore being broken away to more clearly illustrate the hinge means; and Figure 7 is a partial side elevational view of the vehicle body as illustrated in Fig. 6.

Figure 1:
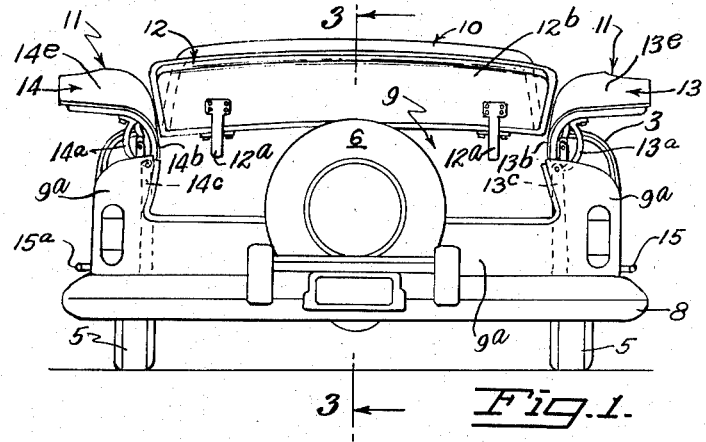
Figure 1 is a rear elevational view of a vehicle body having one modification of the improved luggage or storage compartment embodied therein.

Attention is now directed to the drawing wherein, for the sake of brevity, only the rear portion of a wheel mounted vehicle body 10 is illustrated. The vehicle body 10 is provided with the usual rear fenders 3, windows 4, passenger compartment or space 7, and is supported on rear wheels 5 which are disposed within rear wheel housings 10a. A rear bumper 8 is provided and a spare wheel assembly 6 is secured to and carried by the rear portion of the vehicle body 10 in a manner to be more fully disclosed and described hereinafter.

An improved luggage or storage compartment 9 is provided in the rear portion of the vehicle body 10 with the compartment 9 extending substantially the entire transverse or lateral width of the vehicle body 10 in generally rearwardly spaced relationship to the passenger space 7. The compartment 9 is partly defined by a generally transversely or laterally extending rear portion 9a, generally longitudinally extending transversely or laterally spaced side portions 9b and a floor or bottom portion 9c of the vehicle body 10. The rear 9a and side 9b portions of the vehicle body 10 extend generally upwardly and terminate in given desired generally horizontally disposed planes to enable and provide an access opening for the compartment 9 so that the compartment 9 is substantially continuously unobstructed and open throughout the full extent thereof and along the rear and side portions to enable ready access to the compartment 9 from a side of the vehicle body 10.

As disclosed and described in my U.S. application Serial No. 323,551, for "Vehicle Fuel Tanks," now Patent No. 2,808,892, it is possible to mount a fuel tank, not illustrated, to the side of the drive shaft of the vehicle so that the floor 9c of the compartment 9 may occupy the lowest permissible clearance location normally used by fuel tanks, tire wells, exhaust lines, etc., in conventional construction in order to provide a greater luggage or storage space in the compartment 9. Since the specific structure for mounting the fuel tank forms no part of this invention such structure will not be described or disclosed herein.

In each modification of the improved compartment 9 of this invention, each to be more fully disclosed and described hereinafter, there is provided at least one closure means, indicated generally by the reference numeral 11 which is hinged to the vehicle body 10 for swinging movement about a substantially horizontally disposed axis that extends generally longitudinally of the vehicle body 10 to enable access to be had to the compartment 9 from the one side of the vehicle body 10. In each modification, the closure means 11 includes a normally generally horizontally disposed main body portion having at least one wall portion which depends substantially perpendicular therefrom and which is further normally disposed generally vertically and which further forms a part of the rear fender 3 of the longitudinally extending side of the vehicle body 10 from which access is desired to the compartment 9.

Figure 2:
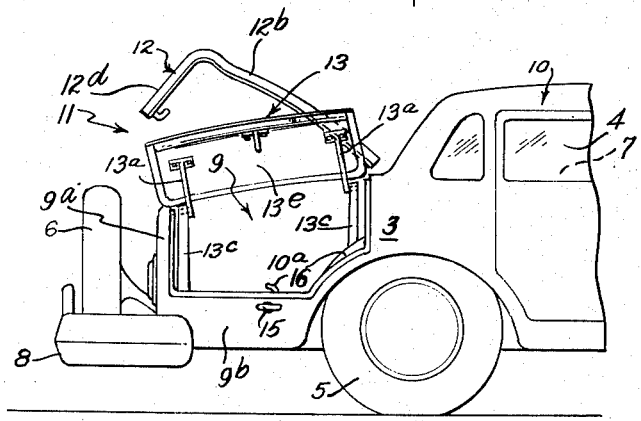
Figure 2 is a partial side elevational view of the vehicle body illustrated in Fig. 1.
Figure 3:
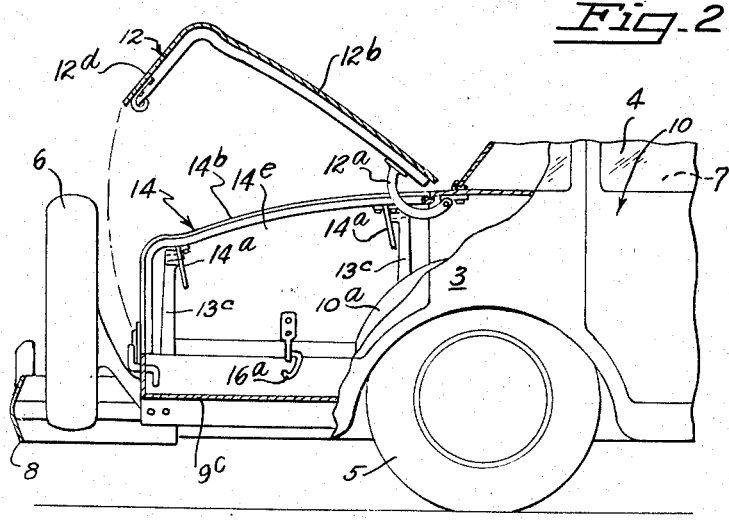
Figure 3 is a partial longitudinal sectional view of the vehicle body taken along the line 3—3 of Fig. 1 looking in the direction of the arrows.

Attention is now directed to the modification of the improved compartment 9, as illustrated in Figs. 1–3, wherein the compartment 9 is partly defined by the rear portion 9a and side portions 9b of the vehicle body 10. A door or closure member 13 is provided for closing a part of the storage compartment 9. The closure member 13 is provided with a normally horizontally disposed main body portion 13b and a normally generally vertically disposed wall portion 13e which normally extends downwardly along the side of the vehicle body 10. Hinge means 13a hingeably connect the closure member 13 to longitudinally spaced upstanding brackets 13c which are secured to the compartment floor portion 9c near a frame support of the vehicle body 10 with the hinge axis being disposed substantially horizontal and extending generally longitudinal of the vehicle body 10 and positioned in a generally vertical plane that is substantially parallel to and/or transversely spaced from the vertical plane of the longitudinally extending center line of the vehicle body 10 which enables the closure member 13 to be upwardly pivoted about the axis of the hinge means 13a so that access to the storage compartment 9 may be had from that side of the vehicle body 10. A handle 15 which operates a latch means 16 is provided for positioning the closure member 13 in the normal closed position, not illustrated.

Another door or closure member 12 is provided for closing the central part of the compartment 9 and the another closure member 12 is provided with a main body portion 12b and a normally generally vertically disposed wall portion 12d which depends downwardly from the main portion 12b and terminates along the access opening as defined by the upstanding rear portion 9a of the vehicle body 10. A hinge means 12a is provided for hingeably mounting the another closure member 12 to the vehicle body 10 and the hinge means 12a is disposed with the hinge axis extending generally laterally or transversely of the vehicle body 10 to enable access to the storage compartment 9 from the rear of the vehicle body 10. An additional door or closure member 14 is provided for closing the remaining part of the compartment 9 and the additional closure member 14 is provided with portions 14b, 14e, handle 15a, latch 16a and is hingeably mounted to the vehicle body 10 by brackets 14c and hinge means 14a. The hinge means 14a is disposed in a generally longitudinally extending substantially vertical plane that is generally parallel to and/or laterally spaced from the vertical plane of the longitudinally extending center line of the vehicle body 10 so that the closure member 14 may move about a generally horizontally disposed substantially longitudinally extending hinge axis to enable access to the compartment 9 from that side of the vehicle body 10. In effect, the closure members 13 and 14 together with the associated elements are disposed enantiomorphously to each other so that each of these closure members will enable access to be had to the compartment from either of the sides of the vehicle body 10.

It is to be noted that each of the wall portions 13e and 14e form part of the adjacent rear fenders 3 and that the wall portions 13e and 14e together with the associated side portions 9b form part of the respective longitudinally extending sides of the vehicle body 10.

It is also to be noted that the closure members 12 and 13 have a juncture along a common line which extends generally longitudinally of the vehicle body 10 for substantially the full length of that side of the closure member 13 which is hingeably mounted to the vehicle body 10. Also, the closure members 12 and 14 also have a juncture along a common line similar to that juncture described above between the closure members 12 and 13 and that these junctures between the respective closure members are disposed to opposite sides of the longitudinal extending center line of the vehicle body 10. If desired, sealing means, not illustrated, may be provided for sealing the junctures between the closure members 13, 12 and 12, 14 along the common lines of contact.

Attention is now directed to the modification of the improved compartment 9, as illustrated in Figs. 4 and 5, wherein this compartment 9 may be partly defined by the rear portion 9a and laterally spaced side portions 9b of the vehicle body 10. In this modification, it is to be noted that a part of the side portion 9b on the left hand side of the vehicle body 10 defines an upstanding wall having an upper portion thereof disposed a substantial distance above the peripheral edge of the opposite side portion of the compartment 9 which is open and the compartment 9 is provided with a single door or closure member 20 having the generally normally horizontally disposed top or main body portion 20b and a wall portion 20d extending generally transversely of the vehicle body 10 and a normally generally vertical wall portion 20e extending along one side of the vehicle body 10. The side of the closure member 20 laterally opposite the wall portion 20e of the closure member 20 is hingeably secured to the upper portion of the upstanding wall of the adjacent side portion 9b of the vehicle body 10 by a hinge means 20a which is disposed in a generally longitudinally extending substantially vertical plane that is generally parallel to and/or transversely spaced from the vertical plane of the longitudinally extending center line of the vehicle body 10 for movement about a generally horizontally disposed longitudinally extending hinge axis so that access to the compartment 9 may be had from the side of the vehicle body 10. It is to be noted that the closure member 20 extends from the hingeable connection 20a to the adjacent side portion 9b of the vehicle body 10 substantially continuously entirely transversely across the vehicle body and terminates in the wall portion 20e which forms the part of the adjacent rear fender 3 with the wall portion 20e also cooperating with the respective side portion 9b to define a part of the longitudinally extending side of the vehicle body 10. By so hingeably mounting the adjacent portion of the closure member 20 to the upper portion of the upstanding wall defined by the side 9b the closure member 20 may be moved to the raised position, as illustrated in Figs. 4 and 5, without effectively increasing the width of the vehicle body 10 an appreciable amount as measured from the longitudinal center line of the vehicle body to that part of the longitudinally extending side 9b which has the hinge means 20a connected thereto. The closure member 20 may be easily moved between the open and closed positions by a handle 21 which may be nested in a guard rail 21a for neatness of appearance and protection and a handle 22 actuates a latch means 23 to retain the closure member 20 in its normal position. The closure member 20 may also be counter balanced by conventional means for easy opening and, if desired, a rod, not illustrated, may be employed to retain the closure member 20 in open position.

In the modification of the improved compartment 9, illustrated in Figs. 6 and 7, wherein the compartment 9 is partly defined by the rear 9a and side 9b portions of the vehicle body 10 there is provided a single door or closure member 30 which extends entirely laterally across or transverse of the vehicle body 10 and includes a generally horizontally disposed main body portion 30b having depending therefrom a transversely or laterally extending wall portion 30d and laterally or transversely spaced longitudinally extending wall portions 30e. One of the wall portions 30e has the lower edge portion thereof hingeably secured to the adjacent side portion 9b of the vehicle body 10 by hinge means 30a which is disposed in a generally longitudinally extending substantially vertical plane that is generally parallel to and/or transversely spaced from the vertical plane of the longitudinally extending center line of the vehicle body for movement about a substantially horizontally disposed generally longitudinally extending axis so that access may be had to the compartment 9 from the other side of the vehicle body. In this modification the wall portions 30d and 30e of the closure member 30 each, respectively, extend down to and terminate immediately adjacent the upstanding rear 9a and side 9b portions of the vehicle body 10, which minimizes the joining edges visible from the rear of the vehicle body 10 and also reduces the possibility of leakage into the compartment 9. In this modification, each of the wall portions 30e form a part of the adjacent rear fenders 3 and it is to be noted that the wall portions 30e also cooperate with the adjacent side portions 9b to form a part of each longitudinally extending side of the vehicle body 10.

A handle 31 enables the closure member 30 to be moved between the open and closed positions and a handle 32 controls a latch means 33 for locking and unlocking the closure member 30. A counterbalance or rod, neither illustrated, may be used, if desired, to hold the closure member 30 open.

It is to be noted, that in each modification of the improved compartment 9 for the vehicle body 10 as disclosed and described above, that there may be provided the spare wheel assembly 6 which is disposed in close proximity to the respective compartment 9 in generally vertically upwardly extending position and which normally would be pivoted to the rear portion of the vehicle body 10 in order that access could be had to a conventional rear compartment from the rear of the vehicle body. However, by the improved compartment 9 and the closure members 13, 14, 20 and 30 of each embodiment of this invention, it is possible that access may be had into the compartment 9 from the side of the vehicle body 10 without disturbing or necessitating the movement of the spare tire assembly 6 from the generally vertical position.

While the invention has been described in terms of a number of preferred embodiments thereof, its scope is intended to be limited only by the claims herein appended.

I claim as my invention:

1. A passenger vehicle having a passenger compartment, rear wheels, a luggage compartment in the rear of said vehicle, said luggage compartment being located largely rearwardly of said rear wheels, a first door to said luggage compartment opening on one side of said vehicle and hinged along a substantially horizontal axis which extends generally longitudinal of said vehicle, a second door to said luggage compartment opening on the other side of said vehicle and hinged along a substantially horizontal axis which extends generally longitudinal of said vehicle, and a third door to said luggage compartment opening over the center thereof and hinged along a substantially horizontal axis which extends generally lateral of said vehicle, both said first and second doors having lines of contact which are common with said third door.

2. A motor vehicle including in combination, a passenger compartment, a separate luggage compartment in the rear of the vehicle, rear wheels, a first door rearwardly of the center of said rear wheels leading from the vehicle exterior into said luggage compartment, said door opening along longitudinal hinge means adjacent an edge thereof with the edge opposite the hinge means being free and extending along one side of the vehicle to give access to said luggage compartment from said one side, and a second door to said luggage compartment opening on laterally extending hinges over the central portion of the luggage compartment, said doors having, when closed, a common line of contact along substantially the complete length of the hinged edge of said first door.

3. The vehicle of claim 2 in which there are means at said common line of contact for sealing against leakage.

4. In a wheel mounted vehicle body having a passenger space, a storage compartment extending substantially the full transverse dimension of the vehicle body in generally rearwardly spaced relation to the passenger space, said storage compartment being substantially continuously unobstructed throughout the full transverse dimension of the vehicle body and open along the rear and a part of one of the generally longitudinally extending sides of the vehicle body to enable ready access into the storage compartment from the said one side of the vehicle body, a first closure member for closing a part of the storage compartment, said first closure member having a normally generally vertically disposed wall portion extending downwardly along the said side of the vehicle body, a first hinge means hingeably connecting a portion of the first closure member to the vehicle body, said first hinge means extending generally longitudinally of the vehicle body to enable said access to the storage compartment from the said one side of the vehicle body, a second closure member for closing another part of the storage compartment, said second closure member terminating along the rear of the vehicle body to enable access to the storage compartment from the rear of the vehicle body, and a second hinge means for hingeably connecting the second closure member to the vehicle body, said second hinge means extending generally transversely of the vehicle body, said first and second closure members having a juncture along a common line extending generally longitudinally of the vehicle body and substantially the full length of the hinged portion of the first closure member.

5. The vehicle body of claim 4 wherein said storage compartment is also open along a part of the other generally longitudinally extending side of the vehicle body, a third closure member and third hinge means enantiomorphous to the first closure member and first hinge means for closing that part of the storage compartment along the said other side of the vehicle body, said second closure member and third closure member also having a juncture along a common line with the said junctures being disposed on opposite sides of the longitudinally extending center line of the vehicle body so that access to the storage compartment may be had from either side of the vehicle body and from the rear thereof.

6. In a wheel mounted vehicle body having passenger space, a storage compartment extending transversely of the vehicle body in generally rearwardly spaced relation to the passenger space, said storage compartment being defined by transversely spaced generally longitudinally extending portions, said storage compartment having a substantially unobstructed access opening extending continuously from one portion transversely across the storage compartment to the other portion thereof, a closure member for closing the access opening, said closure member extending continuously from the said one portion of the storage compartment transversely to the said other portion thereof and having a generally vertically disposed substantially longitudinally extending wall cooperating with the said other portion of the storage compartment to define a part of one longitudinally extending side of the vehicle body, hinge means hingeably connecting the closure member to the said one portion of the storage compartment, said hinge means being disposed in a generally longitudinally extending vertical plane that is transversely spaced from the vertical plane of the longitudinally extending center line of the vehicle body, and a spare wheel assembly mounted in a generally vertical position at the rear of the vehicle body in close proximity to the closure member, whereby said closure member may be raised to enable access to the storage compartment from the said one longitudinally extending side of the vehicle body without disturbing the generally vertical position of the spare wheel assembly.

7. In a wheel mounted vehicle body having passenger space, a storage compartment extending transversely of the vehicle body in generally rearwardly spaced relation to the passenger space, said storage compartment having a substantially unobstructed access opening extending continuously substantially transversely across the rear of the vehicle body and along one longitudinally extending side thereof, a closure member for closing the access opening, said closure member extending continuously from the other longitudinally extending side of the vehicle body substantially transversely thereacross to the said one longitudinally extending side thereof and having generally normally vertically disposed rear and side wall portions, said side wall portion of the closure member defining a part of the said one longitudinally extending side of the vehicle body, hinge means hingeably connecting the closure member to the said other longitudinally extending side of the vehicle body, said hinge means being disposed in a generally longitudinally extending substantially vertical plane that is transversely spaced from the vertical plane of the longitudinally extending center line of the vehicle body, and a spare wheel assembly mounted in a generally vertical position at the rear of the vehicle body in close proximity to the closure member, whereby said closure member may be raised to enable access to the storage compartment from the said one longitudinally extending side of the vehicle body without disturbing the generally vertical position of the spare wheel assembly.

8. In a vehicle body having a storage compartment in the rear portion thereof, said compartment being open along a peripheral edge of one longitudinally extending side and closed along the other longitudinally extending side to define an opening which enables access into the compartment from the one longitudinally extending side of the vehicle body, the other longitudinally extending side of the vehicle body including an upstanding wall having the upper portion thereof disposed a substantial distance above the peripheral edge portion of the open side of the compartment, a closure having a top portion and a depending side portion for closing the compartment, said top portion of the closure extending from the said upstanding wall with the side portion of the closure engaging the peripheral edge of the open side of the compartment so that the side portion defines a part of the said one longitudinally extending side of the vehicle body when the closure is in a storage compartment closing position, and hinge means secured in fixed relation to the said upper portion of the upstanding wall and to the adjacent edge portion of the closure for pivoting the closure about a generally longitudinally extending axis, whereby the closure may be raised to enable such access to the storage compartment from the said one side of the vehicle body without effectively increasing the width of the vehicle body as measured from the longitudinal center line of the vehicle body to the said other longitudinally extending side thereof.

9. A vehicle body having passenger space and a storage compartment located rearwardly of the passenger space, said vehicle body including generally longitudinally extending laterally spaced upstanding side portions at each side of the storage compartment, said storage compartment being open to enable access into the storage compartment over a part of one of the side portions of the vehicle body, a closure for closing said compartment, and hinge means disposed along a generally longitudinally extending axis hingeably connecting one side of the closure to the other side portion of the vehicle body, said hinge means being located a substantial distance above the said part of the one side portion of the vehicle body and a substantial distance from the longitudinal center line of the vehicle body, said one side of the closure being movable without substantially increasing the width of the vehicle body at the closure as measured from the longitudinal center line of the vehicle body to the said other side portion thereof when the closure is fully open, the other side of the closure including another part of the said one side portion of the vehicle body, said another part of the said one side of the vehicle body having the lower edge portion thereof disposed a substantial distance below the hinge means when the closure is closed.

References Cited in the file of this patent

UNITED STATES PATENTS

| | | |
|---|---|---|
| 2,700,572 | Torrance | Jan. 25, 1955 |
| 2,747,923 | McLean | May 29, 1956 |

FOREIGN PATENTS

| | | |
|---|---|---|
| 631,921 | Great Britain | Nov. 11, 1949 |